G. A. WELD.
SUSPENDER BUCKLE.
APPLICATION FILED NOV. 29, 1909.
1,166,955.
Patented Jan. 4, 1916.
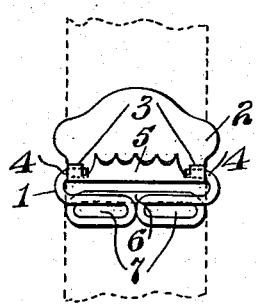
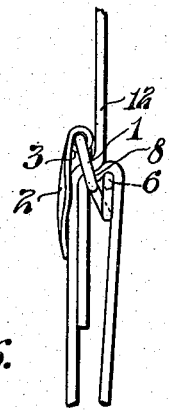
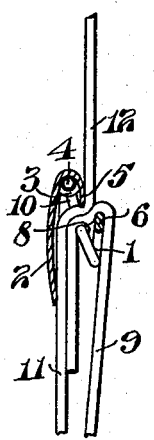
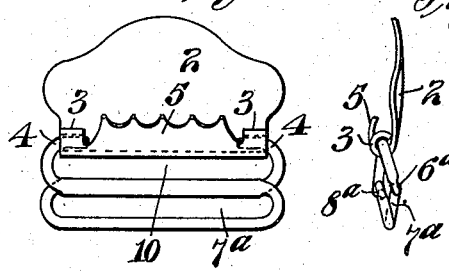
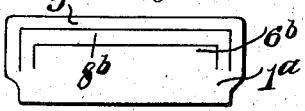
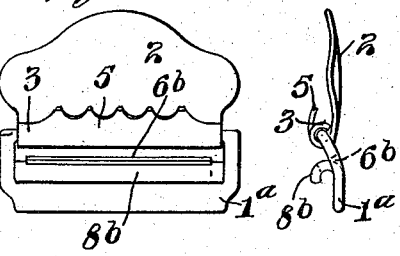
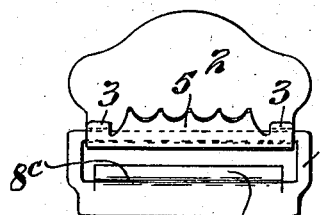
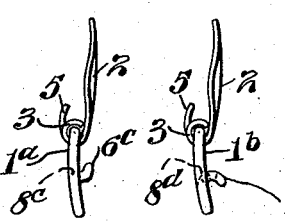
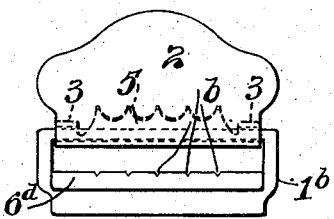
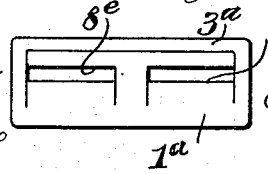
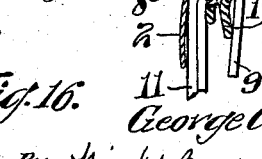
Witnesses:
F. R. Raulston
H. L. Allen
Inventor:
George A. Weld,
By Knight Bros. Dunlap May
Attys.

UNITED STATES PATENT OFFICE.

GEORGE A. WELD, OF BOSTON, MASSACHUSETTS.

SUSPENDER-BUCKLE.

1,166,955. Specification of Letters Patent. Patented Jan. 4, 1916.

Application filed November 29, 1909. Serial No. 530,369.

*To all whom it may concern:*

Be it known that I, GEORGE A. WELD, of Boston, in the county of Suffolk and State of Massachusetts, have invented certain new and useful Improvements in Suspender-Buckles, of which the following is a specification.

This invention relates to buckles adapted to be used in connection with the webbing of which suspenders, garters and other articles of apparel are made, or with which they are provided. More particularly the invention relates to that type of buckle which is so constructed that the webbing may be disposed between the buckle and the wearer to protect the buckle from moisture, so that it will be less liable to rust.

The object of the invention is to provide for more efficient and secure gripping of the webbing to which the buckle is applied by providing two clamping surfaces or grippers adapted to coöperate with the clamp lever and arranged so as to yield when the webbing is pressed against them by the operation of the clamp lever, and also to separate from each other to admit between them that portion of the webbing which is pressed upon by the clamp lever, and thereby to exert a yielding gripping pressure both below and in back of the gripper portion of such clamp lever.

The mode in which the object of my invention is attained is set forth in the following specification and claims, and a construction of buckle in which the invention is embodied is illustrated in the accompanying drawings.

In the drawings, Figure 1 represents such a buckle in front elevation, showing the webbing applied thereto. Fig. 2 is an elevation of the buckle frame with the webbing removed. Fig. 3 is an end elevation of the buckle and webbing showing the position of the parts when the webbing is secured. Fig. 4 is a sectional view of the same. Figs. 5 and 6 are elevations of a modified form of buckle. Fig. 7 is an elevation of a blank from which another modified form of buckle frame is made. Figs. 8 and 9 are respectively a front elevation and an end elevation of a form of buckle, in which a frame made from the blank shown in Fig. 7 is used. Figs. 10 and 11 are front and end elevations of a third modified form of buckle. Figs. 12 and 13 are similar views of a fourth modified form of buckle. Fig. 14 is an elevation of a blank from which the buckle frame of Fig. 12 is made. Fig. 15 is a sectional view of another modified form of buckle. Fig. 16 is an elevation of a blank from which the form of buckle shown in Fig. 15 is made.

The same reference characters indicate the same parts in all the figures.

Referring to Figs. 1–4 of the drawings the buckle there shown consists of a frame member 1 and a clamp member 2, the latter having ears 3 or bearings which surround the pintles 4 of the frame member. Preferably the clamp member is formed of sheet metal of which the ears 3 are integral parts and formed with a clamp or gripper 5 between the ears. This clamp or gripper 5 is arranged to press against and bite into the webbing and is provided with teeth or points to increase the tenacity of its grip.

The frame member or portion 1 is preferably made of wire disposed in such a way as to be resilient. In the preferred form of the buckle the frame member has a straight central portion 6 to form one gripping jaw or gripper which may be flattened if desired. At the ends of this jaw or gripper, the wire is bent downward and inward, and then outward, forming two loops 7 which extend toward one another. The sides 8 of these loops together form a second gripper or jaw which is disposed parallel to the gripper 6 and a slight distance below the upper edge of the same. The ends of the wire are then bent upward and inward, forming the pintles 4, which are approximately in line with each other and are separated from the grippers 6 and 8 by a distance sufficient to admit two thicknesses of webbing. When the clamp member 2 is applied to the pintles it forms one boundary of the space in which the webbing is contained. The buckle is applied to the webbing in the manner shown in Figs. 3 and 4, the end 9 of the webbing being passed through the space 10 in the buckle left for that purpose from the back. The running or adjusting part 12 of the webbing passes through the space 10 outside of the end 9 and is carried upward. By this manner of disposing the webbing the rear of the buckle, or in other words that part which lies next to the body of the wearer, is entirely covered and is protected from moisture, so that liability of rusting is prevented or reduced to the minimum.

When the outer part of the clamp member 2 is raised as shown in Fig. 1, the clamp 5 thereof is lifted away from the grippers or jaws 6 and 8, leaving the space 10 unobstructed for the adjustable part 12 of the webbing to be drawn through. In securing the webbing the clamp member or lever is turned down and the gripping or clamping part 5 thereof presses the webbing downward against the jaws 8 and backward against the gripper 6. The resiliency of the frame member allows the gripping jaws or surfaces 8 to yield downward and the gripping jaws 6 to yield rearwardly so that the clamp 5 is enabled to pass the gripper 8 and lie between the latter and the gripper 6. To permit of this effect the parts 8 are lower or farther removed from the clamp lever than the gripper 6. When clamped the webbing which is pressed upon by the clamp 5 is crowded between the grippers 6 and 8. These grippers then exert a pressure respectively forward and upward against the webbing. In other words, the two yielding portions or grippers, in holding the webbing against the operating member or clamp, exert forces in directions substantially at right angles to each other. Thus the webbing is held between a clamp and two complemental grippers or jaws which press against the opposite side of the webbing from that engaged by the clamp at separated points and on opposite sides of the bite of the clamp.

In order that the gripper or grippers 8 may have a sufficient extent of bearing, it is desirable that they should collectively form a surface as nearly as possible of the same length as the gripper 6 and therefore the loops 7 are made to extend close to one another. The desired effect as to gripping the webbing is secured by so arranging the grippers 6 and 8 with relation to each other that the clamp 5 is adapted to pass over the grippers 8 and, through the interposition of the webbing, separate the gripper 6 laterally or rearwardly therefrom.

In Figs. 5 and 6 is shown a form of buckle embodying the same principles as already described, but having a single loop instead of two. In this form of buckle the wire of which the frame is made has a back jaw $6^a$ and a front jaw $8^a$, both being approximately co-extensive and extending throughout the full width of the buckle. These grippers are connected at opposite ends of a single loop $7^a$, while the pintles 4 connect respectively with the different jaws or grippers. The gripping portions or jaws $6^a$ and $8^a$ are separated so that the prongs of the clamp 5 pass over the latter and crowd the webbing between the two, and the jaw $8^a$ yields downwardly when the clamp prongs are passed over it.

In Figs. 7, 8 and 9 is shown a buckle of which the frame is stamped from sheet metal. Between the side and top edges of the frame $1^a$ cuts are made so as to form a tongue integrally united with the lower part of the frame member blank. Other cuts within and parallel to the outline of said tongue are also made so that a strip is formed which is united with the frame at the ends. This strip is bent over as shown in Fig. 9 and becomes a forward gripper $8^b$, while the material remaining becomes the back gripper $6^b$. The upper part of the frame remaining after this tongue or bar is bent over forms a pintle bar $3^a$ around which the curled ears or bearings 3 of the clamp member are bent.

By reason of its construction, the strip or front gripper $8^b$, which is connected by narrow curved webs or necks of thin sheet metal to the frame of the buckle, is springy and adapted to yield downwardly when the clamp presses on the webbing in passing over it, thereafter pressing upwardly against the webbing. Likewise the rear gripper $6^b$, which is a wide tongue united at its base to the buckle frame, but separated therefrom at its ends, is adapted to yield rearwardly under the pressure exerted in that direction on the webbing by the clamp, and to press on the webbing in the forward direction. Essentially the same conditions as to yielding of, and exertion of pressure by, the grippers exist in this form of gripper as already described in connection with Figs. 1 to 4.

In Figs. 10 and 11 is shown a buckle having a frame $1^a$ made of sheet metal in the central part of which a tongue is stamped. This tongue is bent sharply backward and then its outer edge is bent up as shown in Fig. 11, so that the forward bend becomes a front gripper $8^c$, and the back upwardly bent edge becomes the rear gripper $6^c$ between which the webbing is clamped by the clamp lever. The rear gripper, being formed by the upwardly bent end of a sheet metal tongue, not connected at its sides with the frame of the buckle, is resilient and thereby adapted to yield rearwardly under the pressure applied by the clamp member to the webbing, and to react or press forwardly against the webbing clamped thereby.

In Fig. 14 is shown a sheet metal blank $1^b$ which is cut on the line $a$ to form a tongue integral with the body of the blank. This tongue is apertured with a line of holes $b$ and is bent sharply back along a line passing through central portions of the holes $b$. The manner in which the tongue is bent is shown in Figs. 12 and 13. Those extremities of the holes *b* which appear as the upper and lower extremities thereof in Fig. 14 are then parallel with one another and somewhat separated. The tongues of the clamp lever press the webbing into these holes and between the forward and rear extremities thereof so that such extremities become gripping jaws 8$^d$ and 6$^d$.

The buckle shown in Figs. 15 and 16 is a modification of that shown in Figs. 7, 8 and 9. The jaw 8$^e$ is united at its central part by an integral tongue with the blank out of which the buckle frame is made, instead of being united at its ends, as shown in Fig. 7. The supplemental jaw or back gripper is represented at 6$^e$.

The same capacity for yielding and exerting pressure is found in the grippers 8$^e$ and 6$^e$ as exists in the grippers 8$^b$ and 6$^b$ of the buckle shown in Figs. 8 and 9. Of course, in all of the constructions hereinbefore described in which the rear gripper is adapted to yield rearwardly, such gripper is separable yieldably from the front gripper, and a relative separation between the rear and front gripper takes place whenever the webbing is crowded between the grippers, as described.

The clamp lever for the forms of buckle shown in Figs. 7, 8, 9, 15 and 16 may, if desired, be provided with short teeth bearing directly on the curved tongues or connections by which the jaws or grippers 8$^b$ and 8$^e$ respectively are connected to the body of the frame. The other teeth are longer and crowd the webbing into the space between the front and back jaws or grippers as previously described.

It will be observed that in every case the webbing at the front of the buckle acts as a stop against which the arm portion of the clamp lever 2 bears so that the prongs of the clamp are arrested between the front and back grippers.

I claim,—

1. A buckle comprising a frame, and a clamp lever pivoted thereto, said frame having a bottom grip adapted to yield and permit said clamp lever to pass over it and the interposed webbing, and having also a back grip on the other side of said clamp lever from said bottom grip when the clamp lever is in closed or gripping position, arranged to take the rearward thrust applied by the clamp lever to the webbing and to separate from the front clamp in response to such thrust, whereby the portion of webbing engaged by the clamp lever is held between said grips.

2. A buckle consisting of a frame formed of looped wire, the central part of which is straight and forms a yielding back gripper and the ends of which are bent toward each other parallel to and at a distance from said gripper, forming a pintle, and a clamp lever pivoted to said pintle and forming one boundary of a space for webbing, the wire between said back gripper and the pintle ends being looped to form a bottom gripper parallel with the back gripper and at a greater distance than the latter from the pivot of said clamp lever, and to provide resilience, whereby the bottom gripper is enabled to yield as the clamp lever passes over it, and the back gripper is enabled to separate from the bottom gripper in response to the rearward pressure applied thereon by the clamp lever through the interposed webbing, to receive that portion of the webbing which is engaged by the clamp lever and to grip the same on each side of the bite of the clamp lever.

3. A buckle comprising a swinging clamp and a frame member having two grippers coöperating with said clamp in securing webbing, one of said grippers being resiliently supported in rear of the other with relation to the movement of said clamp, and nearer to the axis about which said clamp swings, whereby it is pressed backward in the course of clamping the webbing and caused to exert a forward gripping pressure on the webbing when the clamp is in closed, or clamping, position.

4. A buckle comprising a frame and an operating member having coactive connecting hinge portions, said operating member having a gripping edge and said frame having a yielding portion arranged to coact with said edge to grip an interposed strip of webbing, said frame having another yielding portion arranged to hold the strip of webbing against said operating member with yielding pressure, said two yielding portions being arranged to exert their yielding forces in directions substantially at right angles to each other.

5. The combination of a buckle and a strip of webbing; said buckle comprising a frame having a pintle portion and gripping members, and a clamp lever pivoted to said pintle portion; the webbing having its end bent around the said gripping members and its running part passed between its end and said clamp lever, whereby the entire buckle is backed by the webbing, and said gripping members being relatively separable yieldingly and so arranged that the clamp lever in closing is caused to pass over one of said members and to crowd the webbing between the members.

6. A buckle comprising a frame having a pintle portion and two gripping members, and a clamp lever having an operating arm and a clamp or gripper complemental to the aforesaid gripping members extending at an acute angle to the operating arm, and having also bearings adjacent to the vertex of the angle between its operating arm and its clamp or gripper which receive said pintle portion; the said gripping members being located below said pintle portion when the buckle is in position for use, and being spaced apart from front to rear by a distance less than their distance from the pintle portion.

In testimony whereof I have affixed my signature, in presence of two witnesses.

GEORGE A. WELD.

Witnesses:
F. R. RULSTONE,
P. W. PEZZETTI.